United States Patent
Matsui et al.

(10) Patent No.: US 9,139,913 B2
(45) Date of Patent: Sep. 22, 2015

(54) ANTI-CORROSION TREATMENT METHOD FOR ALUMINUM HEAT EXCHANGER

(75) Inventors: Norizumi Matsui, Tokyo (JP); Hiroko Okamura, Aichi (JP)

(73) Assignee: NIPPON PAINT CO., LTD., Osaka (JP)

(*) Notice: Subject to any disclaimer, the term of this patent is extended or adjusted under 35 U.S.C. 154(b) by 386 days.

(21) Appl. No.: 13/512,614

(22) PCT Filed: Nov. 26, 2010

(86) PCT No.: PCT/JP2010/071129
§ 371 (c)(1),
(2), (4) Date: Aug. 1, 2012

(87) PCT Pub. No.: WO2011/065482
PCT Pub. Date: Jun. 3, 2011

(65) Prior Publication Data
US 2012/0288634 A1    Nov. 15, 2012

(30) Foreign Application Priority Data
Nov. 30, 2009   (JP) .................................. 2009-272550

(51) Int. Cl.
*B05D 7/14*     (2006.01)
*C23C 26/00*    (2006.01)
*F28F 19/04*    (2006.01)
*B05D 7/22*     (2006.01)
*F28F 21/08*    (2006.01)

(52) U.S. Cl.
CPC ................. *C23C 26/00* (2013.01); *F28F 19/04* (2013.01); *B05D 7/22* (2013.01); *B05D 2202/25* (2013.01); *F28F 21/084* (2013.01); *F28F 2245/02* (2013.01); *F28F 2275/04* (2013.01)

(58) Field of Classification Search
CPC .............................. B05D 7/14; B05D 2202/25
See application file for complete search history.

(56) References Cited

U.S. PATENT DOCUMENTS

2006/0027629 A1 * 2/2006 Inbe et al. ..................... 228/101

FOREIGN PATENT DOCUMENTS

| JP | 6-300482 A | 10/1994 |
| JP | 06300482 A | * 10/1994 |
| JP | 2001-164175 A | 6/2001 |
| JP | 2003-3282 A | 1/2003 |
| JP | 2006-69197 A | 3/2006 |

OTHER PUBLICATIONS

Machine Translation of JP 06300482 A.*
Machine Translation of JP 06300482 A, retrieved online Jul. 22, 2014.*

* cited by examiner

*Primary Examiner* — David Turocy
(74) *Attorney, Agent, or Firm* — Sughrue Mion, PLLC

(57) ABSTRACT

Disclosed is an anti-corrosion treatment method for a heat exchanger, in which even if an aluminum material-made heat exchanger having been flux-brazed by the NB process, in particular, an aluminum material-made heat exchanger to be used for automobile air conditioner is not subjected to a chemical conversion treatment in advance, not only corrosion resistance can be significantly enhanced without impairing hydrophilicity, but deodorizing properties can be enhanced. The anti-corrosion treatment method for an aluminum material-made heat exchanger includes bringing an aluminum material-made heat exchanger having been flux-brazed by the NOCOLOK brazing process into contact with a hydrophilic treatment liquid and then applying a baking treatment, thereby forming a hydrophilic film on the surface of the aluminum material-made heat exchanger, wherein the hydrophilic treatment liquid contains a hydrophilic resin and a lithium ion, and a lithium concentration in the hydrophilic film is from 0.05 to 25% by mass.

6 Claims, No Drawings

ANTI-CORROSION TREATMENT METHOD FOR ALUMINUM HEAT EXCHANGER

CROSS REFERENCE TO RELATED APPLICATIONS

This application is a National Stage of International Application No. PCT/JP2010/071129 filed Nov. 26, 2010, claiming priority based on Japanese Patent Application No. 2009-272550 filed Nov. 30, 2009, the contents of all of which are incorporated herein by reference in their entirety.

TECHNICAL FIELD

The present invention relates to an anti-corrosion treatment method for an aluminum material-made heat exchanger having been flux-brazed by the NOCOLOK brazing process (hereinafter also referred to as "NB process") (the heat exchanger will be hereinafter also referred to as "NB heat exchanger"), in particular, an aluminum material-made heat exchanger to be used for automobile air conditioner. In more detail, the present invention relates to an anti-corrosion treatment method for an NB heat exchanger, in which by subjecting the heat exchanger to a surface treatment with a hydrophilic treatment liquid containing a lithium ion even without being subjected to a chemical conversion treatment in advance, not only corrosion resistance can be significantly enhanced, but deodorizing properties can be enhanced, without impairing hydrophilicity of the surface.

BACKGROUND ART

Heat exchangers which are used for automobile air conditioner usually have a complicated structure in which in order to widen a surface area of the heat exchange as far as possible, aluminum fins are kept at narrow intervals, and furthermore, an aluminum tube for feeding a coolant into these fins is arranged complicatedly. The moisture in air attaches as condensed water to the fin surfaces at the time of operation of the air conditioner; however, on that occasion, the condensed water becomes a water drop in a substantially hemispherical shape on the fin surfaces with poor wettability or exists in a bridge form between the fins, thereby disturbing a smooth flow of exhaustion and increasing the ventilation resistance. If the wettability of the fin surfaces is poor, the heat exchange efficiency is lowered.

Furthermore, in general, aluminum or an alloy thereof constituting an aluminum fin and an aluminum tube (hereinafter referred to as "aluminum fin and so on") is originally excellent in rust preventing properties; however, if the condensed water stays on the fin surface over a long period of time, an oxygen concentration cell is formed, or contaminant components in the air gradually attach thereto and are concentrated, whereby a hydration reaction or a corrosion reaction is accelerated. This corrosion product is accumulated on the fin surface, whereby not only it impairs heat exchange characteristics, but it is scattered as a white fine powder by an air blower.

Then, in order to improve these problems, for example, a surface treatment method in which after cleaning an aluminum material-made heat exchanger with an acid, the heat exchanger is dipped in a zirconium based chemical conversion treatment liquid to achieve a zirconium chemical conversion treatment and then dipped in a hydrophilic treatment liquid composed of a mixture of modified polyvinyl alcohol, a phosphorus compound salt, a boron compound salt, a hydrophilic organic compound, a crosslinking agent, and the like, to achieve a hydrophilic treatment, thereby imparting satisfactory hydrophilicity and deodorizing properties onto the aluminum surface; and the like are proposed (see Patent Document 1).

On the other hand, in an aluminum material-made heat exchanger to be used for automobile air conditioner, after assembling a lot of aluminum fins and aluminum tubes, the aluminum fin and the aluminum fin, or the aluminum fin and the aluminum tube, are joined; however, since a firm and minute oxide film is formed on the surface of aluminum, joining other than a mechanical joining process, such as brazing, soldering, etc., cannot be simply achieved, and the VB process (vacuum brazing process) of achieving brazing in vacuo was chiefly carried out.

However, in recent years, a halogen based flux was developed as a measure for effectively removing or breaking the oxide film, and for such reasons as easiness of control of brazing, inexpensiveness of a furnace, inexpensiveness of brazing processing, etc., a flux brazing process represented by the NB process for performing brazing in a nitrogen gas has been adopted.

This NB process is a process of assembling the aluminum fin and so on and then brazing the aluminum fin and so on in a nitrogen gas by using a flux such as $KAlF_4$, $K_2AlF_5$, etc., and the NB process has also been applied to the fabrication of a heat exchanger in an automobile air condition.

Nevertheless, in the NB heat exchanger fabricated by this NB process, the flux inevitably remains on the aluminum surface, and therefore, there are involved problems which are inherent to the NB heat exchanger such that the surface state becomes heterogeneous; that a uniform surface treatment such as a chemical conversion treatment, a hydrophilic treatment, etc. cannot be achieved; and that corrosion resistance, adhesion, and the like become insufficient.

For that reason, so far, in the surface treatment of the NB heat exchanger, (1) a flux removal step, (2) a chemical conversion treatment step (rust preventing step), and (3) a hydrophilic treatment step are successively performed; however, there is involved such a problem that halogen based wastewater is produced in the flux removal step. Also, in the flux removal step, in order to enhance chemical conversion properties, etching with an acid or an alkali is performed; however, since only the flux cannot be removed, there is involved such a problem that excessive etching on the aluminum fin occurs, so that a uniform chemical conversion treatment cannot be achieved.

Furthermore, in view of a problem of safety to the human body, a chemical conversion treatment which is free from blending of $Cr^{6+}$ is necessary; however, in that case, the corrosion resistance is insufficient. Moreover, a reduction of the number of processes was required, too.

In order to cope with these problems, as a method of surface treating the NB heat exchanger, for example, a surface treatment method in which an NB heat exchanger is dipped in a zirconium based chemical conversion treatment liquid to achieve a zirconium chemical conversion treatment and then dipped in a hydrophilic treatment liquid composed of a mixture of polyvinyl alcohol, a polyoxyalkylene-modified polyvinyl alcohol, an inorganic crosslinking agent, a guanidine compound, and the like, to achieve a hydrophilic treatment, thereby imparting a deodorizing effect in addition to satisfactory anti-corrosive and hydrophilic effects; and the like are proposed (see Patent Document 2).

On the other hand, in particular, as a hydrophilic treatment agent capable of forming a film which is excellent in hydrophilicity and corrosion resistance and also excellent in prevention of frost formation on a heat exchanger fin material of an outdoor unit, a hydrophilic treatment agent for heat exchanger fin material containing (a) a silicate of a metal selected from alkali metals and alkaline earth metals, and preferably lithium silicate, (b) polyvinyl alcohol, and (c) an acrylic resin having a weight average molecular weight falling within the range of from 3,000 to 300,000 and a resin acid value of 400 mg-KOH/g or more, is disclosed; and furthermore, a hydrophilic treatment method for a heat exchanger aluminum fin material, in which this hydrophilic treatment agent is applied onto the surface of an aluminum fin material and baked, thereby forming a film having a dry film thickness of from 0.2 to 5 μm is proposed (see Patent Document 3).

PRIOR ART DOCUMENTS

Patent Documents

Patent Document 1: JP-A-2003-003282
Patent Document 2: JP-A-2006-069197
Patent Document 3: JP-A-2001-164175

SUMMARY OF THE INVENTION

Problems to be Solved by the Invention

According to the method of surface treating the NB heat exchanger described in the foregoing Patent Document 2, in addition to satisfactory anti-corrosive and hydrophilic effects, a deodorizing effect can be imparted. It may be considered that these effects are brought due to the matter that film barrier properties are enhanced by the adsorption of the guanidine compound contained in the hydrophilic treatment liquid onto the aluminum material.

On the other hand, the hydrophilic treatment agent for heat exchanger fin described in Patent Document 3 contains polyvinyl alcohol and a specified acrylic resin and also contains preferably lithium silicate. This technology contrives to prevent the frost formation by an enhancement of the hydrophilicity by lowering a water contact angle of the obtained film.

But, the hydrophilic treatment agent disclosed in Cited Document 3 is one to be used for a heat exchanger fin material of an outdoor unit, and the hydrophilic treatment agent is applied to an aluminum plate before assembling aluminum fins. Thus, the foregoing problems which are inherent to the hydrophilic treatment on heat exchangers fabricated by the NB process do not exist.

Under these circumstances, the present invention has been made, and an object thereof is to provide an anti-corrosion treatment method for an aluminum material-made heat exchanger having been flux-brazed by the NB process, in particular, an aluminum material-made heat exchanger to be used for automobile air conditioner, in which even when a chemical conversion treatment is not applied to the heat exchanger in advance, not only corrosion resistance can be significantly enhanced, but deodorizing properties can be enhanced, without impairing hydrophilicity.

Means for Solving the Problems

In order to achieve the foregoing object, the present inventors made extensive and intensive investigations. As a result, it has been found that by subjecting an aluminum material-made heat exchanger having been flux-brazed by the NB process to a surface treatment with a hydrophilic treatment liquid containing a hydrophilic resin and a lithium ion, not only corrosion resistance can be significantly enhanced, but deodorizing properties can be enhanced, without impairing hydrophilicity of the surface. It may be considered that this is caused due to the following actions.

It may be considered that the lithium ion acts on the dissolved flux under a film having been subjected to a surface treatment (hydrophilic treatment or chemical conversion treatment) in a corrosive environment and becomes sparingly soluble by converting into as $Li_2AlF_5$ or the like, thereby bringing an effect for suppressing a corrosion start point. That is, the present invention acts on the flux remaining on the aluminum material, thereby enhancing the corrosion resistance of the aluminum material-made heat exchanger.

The present invention has been accomplished on such knowledge.

That is, the present invention provides:

(1) An anti-corrosion treatment method for an aluminum material-made heat exchanger comprising subjecting an aluminum material-made heat exchanger having been flux-brazed by the NOCOLOK brazing process to hydrophilic treatment liquid and then applying a baking treatment to form a hydrophilic film on the surface of the aluminum material-made heat exchanger, wherein
the hydrophilic treatment liquid contains a hydrophilic resin and a lithium ion, and a lithium concentration in the hydrophilic film is from 0.05 to 25% by mass;

(2) The anti-corrosion treatment method for an aluminum material-made heat exchanger as set forth above in (1), wherein a film amount of the hydrophilic film is from 0.1 to 5.0 $g/m^2$;

(3) The anti-corrosion treatment method for an aluminum material-made heat exchanger as set forth above in (1) or (2), wherein after subjecting the heat exchanger to a chemical conversion treatment in advance, the heat exchanger is brought into contact with the hydrophilic treatment liquid and then subjected to a baking treatment;

(4) The anti-corrosion treatment method for an aluminum material-made heat exchanger as set forth above in (1) or (2), wherein the heat exchanger is an aluminum material-made heat exchanger which has not been subjected to a chemical conversion treatment in advance;

(5) The anti-corrosion treatment method for an aluminum material-made heat exchanger as set forth above in any one of (1) to (4), wherein the hydrophilic resin is polyvinyl alcohol having a degree of saponification of 90% or more and/or modified polyvinyl alcohol; and (6) The anti-corrosion treatment method for an aluminum material-made heat exchanger as set forth above in any one of (1) to (5), wherein the hydrophilic treatment liquid further contains a crosslinking agent.

Effects of the Invention

According to the present invention, an anti-corrosion treatment method for a heat exchanger, in which by subjecting an aluminum material-made heat exchanger having been flux-brazed by the NB process, in particular, an aluminum material-made heat exchanger to be used for automobile air conditioner to a surface treatment with a hydrophilic treatment liquid containing a lithium ion, not only the corrosion resistance can be significantly enhanced without impairing the hydrophilicity of the surface, but the deodorizing properties can be enhanced, thereby enabling one to keep the corrosion resistance and the hydrophilicity over a long period of time, can be provided. Also, since the chemical conversion treatment to be performed before the hydrophilic treatment can be omitted, the step number can be reduced, whereby the wastewater can be reduced, and compacting of the treatment apparatus can be realized.

MODES FOR CARRYING OUT THE INVENTION

The anti-corrosion treatment method for an aluminum material-made heat exchanger of the present invention is a method of bringing an aluminum material-made heat exchanger having been subjected to flux-brazed by the NB process into contact with a hydrophilic treatment liquid and then applying a baking treatment to form a hydrophilic film on the surface, wherein the hydrophilic treatment liquid contains a hydrophilic resin and a lithium ion, and a lithium concentration in the hydrophilic film is from 0.05 to 25% by mass.

[Heat Exchanger]

The present invention is to significantly enhance the corrosion resistance of an NB heat exchanger through an action on the flux remaining on the surface of the heat exchanger. In consequence, the heat exchanger which is used in the present invention is an aluminum material-made heat exchanger having been flux-brazed by the NB process. The flux inevitably remains on the surface of the heat exchanger.

Examples of the NB heat exchanger include aluminum material-made heat exchangers which are used for automobile air conditioner. Incidentally, the "aluminum material" as referred to in the present invention means aluminum or an aluminum alloy.

In the heat exchanger, aluminum material-made fins and tubes are joined with each other by the known NB process for achieving brazing in a nitrogen gas.

The flux which is used in the NB process is not particularly limited so far as it is a flux containing a salt constituted of an anion capable of forming a sparingly soluble salt together with a lithium ion, and a usual halogen based flux which is used in the NB process can be used. Examples of such a halogen based flux include $KAlF_4$, $K_2AlF_5$, $K_3AlF_6$, $CsAlF_4$, $Cs_3AlF_6$, $Cs_2AlF_5$, and mixtures of two or more kinds thereof.

[Hydrophilic Treatment of Heat Exchanger with Hydrophilic Treatment Liquid]

In the present invention, the heat exchanger which has been fabricated in the manner described above by joining aluminum material-made fins and tubes with each other by means of flux brazing by the NB process and assembling is brought into contact with a hydrophilic treatment liquid and then subjected to a baking treatment to form a hydrophilic film on the surface, followed by applying a hydrophilic treatment.

(Hydrophilic Treatment Liquid)

The hydrophilic treatment liquid which is used in the present invention is an aqueous solution or an aqueous dispersion liquid containing a hydrophilic resin and a lithium ion in an aqueous solvent.

<Hydrophilic Resin>

Though the hydrophilic resin is not particularly limited, it is preferably a water-soluble or water-dispersible hydrophilic resin having a hydroxyl group, a carboxyl group, an amide group, an amino group, a sulfonic acid group, and/or an ether group in a molecule thereof. The hydrophilic resin is preferably a resin capable of forming a film such that its contact angle with a water drop is not more than 40 degrees. Since such a film exhibits satisfactory hydrophilicity, when the hydrophilic treatment liquid containing the foregoing hydrophilic resin is applied, sufficient hydrophilicity can be imparted to a material to be treated. As the hydrophilic resin, for example, polyvinyl alcohol, polyvinylpyrrolidone, polyacrylic acid, polystyrenesulfonic acid, polyacrylamide, carboxymethyl cellulose, chitosan, polyethylene oxide, water-soluble nylon, copolymers of monomers for forming these polymers, acrylic polymers having a polyoxyethylene chain, such as a 2-methoxypolyethylene glycol methacrylate/2-hydroxyethyl acrylate copolymer, etc., and so on are preferable. A single kind of such a material may be used alone, or a combination of two or more kind thereof may be used.

Not only such a hydrophilic resin has excellent hydrophilicity and water resistance, but the resin itself does not have an offensive odor, and an odoriferous substance hardly adsorbs thereonto. Therefore, the hydrophilic treatment liquid containing the foregoing hydrophilic resin is excellent in hydrophilicity and deodorizing properties, and even when the obtained hydrophilic film is exposed to a water drop or running water, it is hardly deteriorated. Thus, inorganic materials which are contained, if desired and emit an own dusty odor or an unpleasant odor of an adsorbed substance, such as silica, etc., or other residual monomer components are hardly exposed, so that it is possible to prevent the emission of the dusty odor to be caused due to scattering of the material come from hydrophilic treatment liquid.

The hydrophilic resin preferably has a number average molecular weight falling within the range of from 1,000 to 1,000,000. So far as the number average molecular weight is 1,000 or more, film forming properties, hydrophilicity, and other film physical properties are satisfactory, whereas so far as it is not more than 1,000,000, the viscosity of the hydrophilic treatment liquid does not become excessively high, and workability and film physical properties are satisfactory. The number average molecular weight is more preferably in the range of from 10,000 to 200,000.

Incidentally, in the present invention, the number average molecular weight of the hydrophilic resin is a value measured by the gel permeation chromatography (GPC method) as reduced into standard polystyrene.

From the standpoints of excellent odor control and impartation of hydrophilicity, the hydrophilic resin is more preferably polyvinyl alcohol, and especially preferably polyvinyl alcohol having a degree of saponification of 90% or more and/or modified polyvinyl alcohol.

(a) Polyvinyl alcohol having a degree of saponification of 90% or more:

Though the polyvinyl alcohol having a degree of saponification of 90% or more has itself a performance of imparting hydrophilicity, it is a hydrophilic resin having high water resistance, is able to minutely coat the aluminum fins, and has high deodorizing properties and effect for suppressing attached odors because of high water resistance of the resin. From the viewpoint of the foregoing effects, the degree of saponification is especially preferably 95% or more. When the degree of saponification is less than 90%, there may be the case where the hydrophilicity is inferior.

In the present invention, in the case of using polyvinyl alcohol having a degree of saponification of 90% or more as the hydrophilic resin, from the viewpoint of the foregoing effects, its content is preferably from 10 to 90% by mass, and more preferably from 20 to 80% by mass relative to the whole of solids of the hydrophilic treatment liquid.

(b) Modified polyvinyl alcohol:

As the modified polyvinyl alcohol, a polyoxyalkylene-modified polyvinyl alcohol in which a polyoxyalkylene ether group represented by the following general formula (1) accounts for from 0.01 to 20% in pendant groups thereof can be used.

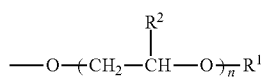

(1)

[In the formula, n represents an integer of from 1 to 500; $R^1$ represents a hydrogen atom or an alkyl group having a carbon number of from 1 to 4; and $R^2$ represents a hydrogen atom or a methyl group.]

In the polyoxyalkylene-modified polyvinyl alcohol, the polyoxyalkylene-modified group accounts for from 0.1 to 5% in the pendant groups, and a polymerization degree n of the polyoxyalkylene group is preferably from 3 to 30.

In particular, the polyoxyalkylene-modifies polyvinyl alcohol plays a role to impart hydrophilicity in the hydrophilic treatment liquid because of the hydrophilicity of the polyoxyalkylene group.

In the present invention, in the case of using the polyoxyalkylene-modified polyvinyl alcohol as the hydrophilic resin, from the viewpoint of the effect for imparting hydrophilicity, its content is preferably from 3 to 60% by mass, more preferably from 3 to 40% by mass, and still more preferably from 5 to 30% by mass relative to the whole of solids of the hydrophilic treatment liquid.

Incidentally, in the present invention, in the case of using, as the hydrophilic resin, the polyvinyl alcohol having a degree of saponification of 90% or more and the polyoxyalkylene-modified polyvinyl alcohol in combination, from the viewpoint of a balance between the hydrophilicity and the deodorizing properties, a blending proportion of the both is preferably in the range of from 10/1 to 1/4, and more preferably in the range of from 5/1 to 1/3. By using the both in combination, a hydrophilic film which is satisfactory in deodorizing properties and excellent in hydrophilic durability is obtained.

<Lithium Ion>

The hydrophilic treatment liquid contains a lithium ion together with the foregoing hydrophilic resin. A source of this lithium ion may be a lithium compound capable of forming a lithium ion in the hydrophilic treatment liquid and is not particularly limited. For example, lithium hydroxide, lithium sulfate, lithium carbonate, lithium nitrate, lithium acetate, lithium citrate, lithium lactate, lithium phosphate, lithium oxalate, lithium silicate, lithium metasilicate, and so on can be used. Above all, from the standpoint of small influences against odors, it is preferable to use lithium hydroxide, lithium sulfate, or lithium carbonate. A single kind of such a lithium ion source may be used alone, or a combination of two or more kinds thereof may be used.

In the present invention, when an aluminum material-made heat exchanger having been flux-brazed by the NB process is subjected to a surface treatment with such a hydrophilic treatment liquid containing a lithium ion to form a hydrophilic film, the corrosion resistance can be significantly enhanced.

So far as an inference is made on a mechanism of significantly enhancing the corrosion resistance, by utilizing an ion exchange reaction between an alkali metal ion such as a potassium ion, etc. in a flux, especially a halogen based flux and a lithium ion from the hydrophilic film, a sparingly soluble film is formed at an interface between the flux residue and the hydrophilic film.

As the ion exchange reaction, for example, a reaction represented by the following formula (2) may be considered.

(2)

(Here, as for x and y, when x is 1, then y is 4, when x is 2, then y is 5, or when x is 3, then y is 6.)

The flux residue is chiefly a composite compound of potassium fluoride or cesium fluoride and aluminum fluoride, and the present invention is concerned with an enhancement of rust preventing properties (corrosion resistance) of the flux residue by applying a surface treatment with the hydrophilic treatment liquid containing a lithium ion to cause an ion exchange reaction of a potassium ion, etc. in the flux residue and a lithium ion from the hydrophilic film, thereby forming a layer containing a sparingly soluble lithium salt at least at an interface between the flux residue and the hydrophilic film. In this way, the present invention acts on the flux residue to contrive to enhance the corrosion resistance.

Also, since lithium in the hydrophilic film remains over a long period of time, the foregoing effects are able to sustain over a long period of time.

In the present invention, from the viewpoint of a balance between the enhancing effect of corrosion resistance and the economy, or the like, a concentration of lithium in the hydrophilic film (concentration in the whole of solids) is from 0.05 to 25% by mass, and preferably from 0.1 to 10% by mass. When the concentration of lithium in the hydrophilic film (concentration in the whole of solids) is less than 0.05% by mass, the corrosion resistance is insufficient, and even when it exceeds 25% by mass, the corrosion resistance is not enhanced, and the economy is no good.

<Crosslinking Agent>

In the hydrophilic treatment liquid, for the purpose of enhancing the water resistance of the hydrophilic film to be formed using the same, a crosslinking agent can be contained, if desired.

As the crosslinking agent, an inorganic crosslinking agent or an organic crosslinking agent which reacts with the hydroxyl groups of the polyvinyl alcohol or modified polyvinyl alcohol can be used.

Examples of the inorganic crosslinking agent include silica compounds such as silicon dioxide, etc., zirconium compounds such as ammonium fluorozirconate, ammonium zirconium carbonate, etc., metal chelate compounds such as titanium chelate, etc., phosphorus based compounds such as phosphates of Ca, Al, Mg, Fe, Zn, etc., condensed phosphoric acid, etc., and so on.

On the other hand, examples of the organic crosslinking agent include melamine resins, phenol resins, epoxy compounds, blocked isocyanate compounds, oxazoline compounds, carbodiimide compounds, and so on.

A single kind of such a crosslinking agent may be used alone, or a combination of two or more kinds thereof may be used.

In the present invention, from the viewpoint of a balance between the crosslinking effect and the economy, a content of the crosslinking agent is preferably from 0.1 to 70% by mass, and more preferably from 2 to 50% by mass relative to the whole of solids in the hydrophilic treatment liquid.

<Guanidine Compound and Salt Thereof>

In the hydrophilic treatment liquid, a guanidine compound and/or a salt thereof can be contained, if desired.

This guanidine compound is a compound represented by the following general formula (3).

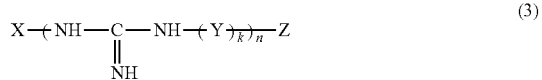

(3)

[In the formula, Y represents —C(=NH)—(CH$_2$)$_m$—, —C(=O)—NH—(CH$_2$)$_m$—, or —C(=S)—NH—(CH$_2$)$_m$—; m represents an integer of from 0 to 20; n represents a positive integer; k represents 0 or 1; X represents hydrogen, an amino group, a hydroxyl group, a methyl group, a phenyl group, a chlorophenyl group, or a methylphenyl group (tolyl group); and Z represents hydrogen, an amino group, a hydroxyl group, a methyl group, a phenyl group, a chlorophenyl group, a methylphenyl group (tolyl group), or a polymer composed of, as a repeating unit, one of polymerizable groups represented by the following general formula (4):

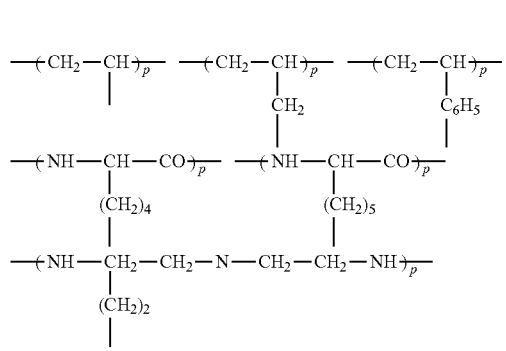

(4)

(in the formulae, p represents an integer) and having a mass average molecular weight of from 200 to 1,000,000.]

The guanidine compound is not particularly limited, and for example, guanidine, aminoguanidine, guanyl thiourea, 1,3-diphenylguanidine, 1,3-di-o-tolylguanidine, 1-o-tolylbiguanide, polyhexamethylene biguanidine, polyhexaethylene biguanidine, polypentamethylene biguanidine, polypentaethylene biguanidine, polyvinylbiguanidine, polyallylbiguanidine, and so on can be exemplified. A single kind of such a guanidine compound may be used alone, or a combination of two or more kinds thereof may be used.

On the other hand, as a salt of the guanidine compound, for example, inorganic acid salts such as phosphates, hydrochlorides, sulfates, etc.; and organic acid salts such as acetates, gluconates, etc. can be exemplified. A single kind of such a salt may be used alone, or a combination of two or more kinds thereof may be used.

Also, in the present invention, one or more kinds of guanidine compounds maybe used, one or more kinds of guanidine compound salts may be used, or one or more kinds of guanidine compounds and one or more kinds of guanidine compound salts may be used in combination.

This guanidine compound or salt thereof has an effect for imparting excellent rust preventing properties to the hydrophilic film to be formed using the hydrophilic treatment liquid.

The guanidine compound preferably has a mass average molecular weight falling within the range of from 59 as a lower limit to 1,000,000 as an upper limit. In the general formula (3), in view of the fact that the molecular weight of the guanidine which becomes the minimum is 59, the molecular weight cannot be made less than 59, whereas when it exceeds 1,000,000, there is a concern that the guanidine compound is not soluble in water. The foregoing lower limit is more preferably 300, and still more preferably 500. The foregoing upper limit is more preferably 100,000, and still more preferably 20,000.

Incidentally, a mass average molecular weight of the guanidine compound salt is a total sum of the foregoing mass average molecular weight of the guanidine compound and a total molecular weight of the salts added to the guanidine compound.

Incidentally, the mass average molecular weight of the guanidine compound is a value measured by the GPC method as reduced into standard polystyrene.

In view of the fact that the effect for imparting rust preventing properties to the hydrophilic film to be formed using the hydrophilic treatment liquid is large, the guanidine compound and/or salt thereof is preferably a compound having a guanidine structure represented by the following general formula (5) in a molecule thereof:

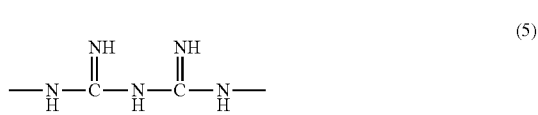

(5)

and/or a salt thereof. The guanidine compound having the foregoing structure and/or salt thereof is not particularly limited, and for example, polyhexamethylene biguanidine, 1-o-tolylbiguanide, chlorhexidine gluconate, and/or salts thereof, and so on can be exemplified. The guanidine compound and/or salt thereof may be used alone, or may be used in combination of two or more kinds thereof.

The guanidine compound and/or salt thereof has an excellent rust preventive effect, and from the viewpoint of a balance between the rust preventive effect and the economy, or the like, its content in the hydrophilic treatment liquid is preferably from 1 to 20% by mass, and more preferably from 2 to 10% by mass relative to the whole of solids of the hydrophilic treatment liquid.

<Other Arbitrary Components>

If desired, a dispersant, a rust preventive additive, a pigment, a silane coupling agent, an antifungal agent (preservative), a surfactant, a lubricant, a deodorant, and the like can be properly contained as other arbitrary components in the hydrophilic treatment liquid.

The dispersant is not particularly limited, and a surfactant, a dispersion resin, and so on can be exemplified.

The rust preventing additive is not particularly limited, and for example, tannic acid, an imidazole compound, a triazine compound, a triazole compound, a hydrazine compound, a zirconium compound, and so on can be exemplified. Above all, a zirconium compound is preferable because the rust preventing properties can be effectively imparted. The zirconium compound is not particularly limited, and for example, an alkali metal fluorozirconate such as K$_2$ZrF$_6$, etc.; a soluble fluorozirconate such as (NH$_4$)$_2$ZrF$_6$, etc.; a fluorozirconic acid such as H$_2$ZrF$_6$, etc.; zirconium fluoride; zirconium oxide; and so on can be exemplified.

As the pigment, for example, various coloring pigments such as inorganic pigments, e.g., titanium oxide (TiO$_2$), zinc oxide (ZnO), zirconium oxide (ZrO), calcium carbonate (CaCO$_3$), barium sulfate (BaSO$_4$), alumina (Al$_2$O$_3$), kaolin clay, carbon black, iron oxides (Fe$_2$O$_3$ and Fe$_3$O$_4$), and aluminum oxide (Al$_2$O$_3$); organic pigments; and so on can be exemplified.

Using a silane coupling agent is preferable from the standpoints that the affinity between the hydrophilic resin and the pigment is enhanced; and that the adhesion or the like can be enhanced.

The silane coupling agent is not particularly limited, and for example, γ-aminopropyltrimethoxysilane, γ-aminopropyltriethoxysilane, γ-glycidoxypropyltrimethoxysilane, γ-methacryloxypropyltriethoxysilane, N-[2-(vinylbenzylamino) ethyl]-3-aminopropyltrimethoxysilan e, and so on can be exemplified.

The antifungal agent (preservative) is not particularly limited, and for example, conventionally known antifungal agents (preservatives) such as 2-(4-thiazolyl)benzimidazole, zinc pyrithione, benzoisothiazoline, and so on can be used.
<Solvent>

Though the solvent of the hydrophilic treatment liquid is not particularly limited, an aqueous solvent mainly composed of water is preferable from the viewpoint of wastewater treatment or the like. Also, for the purpose of enhancing the film forming properties to form a more uniform and smooth film, a solvent may be used in combination. The solvent is not particularly limited so far as it is generally used for paints and can be uniformly mixed with water, and for example, alcohol based, ketone based, ester based, or ether based organic solvents, and so on can be exemplified. A use amount of the solvent is preferably from 0.01 to 5% by mass in terms of a content of the solvent in the hydrophilic treatment liquid.

For the purpose of enhancing the stability as a treating agent, a pH of the hydrophilic treatment agent may be adjusted. The pH adjustment can be carried out using general acids or alkalis such as sulfuric acid, nitric acid, ammonia, etc.
<Concentration of Each Component in Hydrophilic Treatment Liquid>

From the viewpoints of workability, uniformity and thickness of the hydrophilic film to be formed, economy, and the like, a concentration of the whole of solids in the hydrophilic treatment liquid is preferably from 1 to 11% by mass, and more preferably from 2 to 5 parts by mass. Also, a concentration of the hydrophilic resin in the hydrophilic treatment liquid is preferably from 0.01 to 10% by mass, and more preferably from 0.1 to 5% by mass.

In the case of using polyvinyl alcohol having a degree of saponification of 90% or more as the hydrophilic resin, its concentration is preferably from 0.1 to 10% by mass, and more preferably from 0.2 to 9.0% by mass; and in the case of using a polyoxyalkylene-modified polyvinyl alcohol, its concentration is preferably from 0.03 to 4.4% by mass, and more preferably from 0.05 to 3.3% by mass.

A lithium ion concentration is preferably from 0.001 to 2.5% by mass, and more preferably from 0.05 to 1.0% by mass.

Also, in the case of using a crosslinking agent that is an arbitrary component, a concentration of the crosslinking agent is preferably from 0.001 to 8% by mass, and more preferably from 0.02 to 1.0% by mass. A concentration of the guanidine compound and/or salt thereof is preferably from 0.01 to 5.5% by mass, and more preferably from 0.02 to 3% by mass.

A total concentration of other arbitrary components is preferably from 0.001 to 5% by mass, and more preferably from 0.02 to 1% by mass.
(Rust Prevention Treatment)

In the present invention, a rust prevention treatment of bringing an aluminum material-made heat exchanger (material to be treated) having been flux-brazed by the NB process into contact with the foregoing hydrophilic treatment liquid and then applying a baking treatment to form a hydrophilic film on the surface is carried out.

It is preferable that the material to be treated is subjected to a rinsing treatment with hot water by a conventionally known method before the hydrophilic treatment.

As a method of subjecting the NB heat exchanger as the material to be treated to the hydrophilic treatment liquid, a dipping process, a spraying process, a coating process, and so on are exemplified; however, in view of the fact that the NB heat exchanger as the material to be treated has a complicated shape, a dipping process is preferable. In the case of adopting a dipping process, a dipping treatment is usually performed at room temperature for about 10 seconds. A film amount of the hydrophilic film to be formed can be controlled by adjusting an attached amount of the hydrophilic liquid by means of air blowing.

After bringing the material to be treated into contact with the hydrophilic treatment liquid in this way, the material to be treated is further subjected to a baking treatment by heating such that its own temperature is from 130 to 150° C., thereby forming a hydrophilic film. In the present invention, from the viewpoints of corrosion resistance and economy, the film amount of this hydrophilic film is preferably in the range of from 0.1 to 5.0 g/m$^2$. The film amount is more preferably from 0.1 to 1.5 g/m$^2$, and still more preferably from 0.2 to 1.0 g/m$^2$.

In the NB heat exchanger having been subjected to a hydrophilic treatment with a lithium ion-containing hydrophilic treatment liquid in this way, nevertheless the flux residue is present, even when the heat exchanger is not subjected to a chemical conversion treatment in advance, not only the corrosion resistance can be significantly enhanced without impairing the hydrophilicity of the surface, but the deodorizing properties can be enhanced.

In the present invention, the sufficient corrosion resistance can be imparted even without subjecting the heat exchanger to a chemical conversion treatment in advance; however, for the purpose of more enhancing the corrosion resistance, if desired, after subjecting the heat exchanger to a chemical conversion treatment in advance, the heat exchanger may be subjected to a hydrophilic treatment with a lithium ion-containing hydrophilic treatment liquid by the foregoing method.

A method of the chemical conversion treatment is not particularly limited, and conventionally known various chemical conversion treatments can be adopted; however, in view of a problem of safety to the human body, a chemical conversion treatment which is free from blending of $Cr^{6+}$ is preferable. As such a chemical conversion treatment, for example, a zirconium chemical conversion treatment, a titanium chemical conversion treatment, and so on can be exemplified. It is desirable that this chemical conversion treatment is carried out after the rinsing treatment with hot water of the NB heat exchanger that is a material to be treated.

The zirconium chemical conversion treatment is hereunder taken up and described.
[Zirconium Chemical Conversion Treatment]

The zirconium chemical conversion treatment is a treatment of the material to be treated with a zirconium chemical conversion treatment liquid containing zirconium and having a pH of from 3 to 5.

The zirconium chemical conversion treatment liquid containing zirconium, which is used in the present invention, is a solution in which a zirconium based compound is dissolved in water, and a zirconium ion is allowed to serve as an active species. Examples of the zirconium based compound include zirconium compounds such as fluorozirconic acid, zirconium fluoride, etc.; and their salts of lithium, sodium, potassium, ammonium, etc. Also, a zirconium compound such as zirconium oxide, etc. may be dissolved with a fluoride such as hydrofluoric acid, etc.

Though a content of zirconium of this zirconium chemical conversion treatment liquid is not particularly limited, it is preferably from 50 to 5,000 ppm, more preferably from 100 to 3,000 ppm, and still more preferably from 300 to 1,500 ppm. From the viewpoint of rust preventing properties, an amount of the zirconium chemical conversion film on the surface of the aluminum material of the NB heat exchanger is preferably from 1 to 200 mg/m$^2$, and more preferably from 2 to 150 mg/m$^2$.

A pH of this zirconium chemical conversion treatment liquid is preferably in the range of from 3 to 5. So far as the pH is 3 or more, the zirconium chemical conversion film can be formed without causing an excess of etching with the zirconium chemical conversion treatment liquid, and so far as the pH is not more than 5, a sufficient amount of the zirconium chemical conversion film can be obtained without causing a shortage of etching. The pH is more preferably from 3.5 to 4.5. The pH adjustment can be carried out using general acids or alkalis such as sulfuric acid, nitric acid, ammonia, etc.

Also, in order to enhance the rust preventing properties, this zirconium chemical treatment liquid may contain, in addition to the zirconium based compound, a metal ion of titanium, manganese, zinc, cerium, vanadium, trivalent chromium, etc.; a rust preventive such as a phenol resins, etc.; a silane coupling agent for the purpose of enhancing the adhesion; phosphoric acid for the purpose of accelerating the chemical conversion reaction; and the like.

In the present invention, the method of the zirconium chemical conversion treatment is not particularly limited, and it may be any of a spraying process, a dipping process, etc.

Also, a temperature of the zirconium chemical conversion treatment liquid is preferably from 50 to 70° C., and more preferably from 55 to 65° C. Also, a time of the zirconium chemical conversion treatment is preferably from 20 to 900 seconds, and more preferably from 30 to 600 seconds. So far as the temperature of the treatment liquid and the time of treatment fall within the foregoing ranges, a zirconium chemical conversion film having rust preventing properties can be formed.

When the NB heat exchanger having been subjected to a zirconium chemical conversion treatment in this way is subjected to a surface treatment with the foregoing hydrophilic treatment liquid containing a lithium ion to form a hydrophilic film having a film amount of from 0.1 to 5.0 g/m$^2$, not only the corrosion resistance can be more significantly enhanced without impairing the hydrophilicity of the surface as compared with the case where the chemical conversion treatment is not applied in advance, but the deodorizing properties can be enhanced.

The anti-corrosion treatment method of the NB heat exchanger of the present invention is applied to, as the heat exchanger that is a material to be treated, a heat exchanger fabricated by joining aluminum material-made fins and tubes with each other by means of flux brazing by the NB process and assembling, in particular, a heat exchanger to be used for automobile air conditioner.

EXAMPLES

The present invention is hereunder described in more detail by reference to the following Examples, but it should not be construed that the present invention is limited to only these Examples. Also, in the Examples, "%" and "parts" mean "% by mass" and "parts by mass", respectively unless otherwise indicated.

Incidentally, a test heat exchanger having been subjected to a hydrophilic treatment with a hydrophilic treatment liquid obtained in each of the Examples was evaluated with respect to the following physical properties.

(1) Corrosion Resistance:

In conformity with JIS Z2371, a 5% sodium chloride aqueous solution was sprayed at 35° C., and after 500 hours, an area where white rust formed was visually evaluated at intervals of 0.5 points on the basis of the following criteria.

As for the corrosion resistance evaluation, a score of 8 or more is preferable.

10: No white rust formed.
9: An area where white rust formed is less than 10%.
8. An area where white rust formed is less than 20%.
7: An area where white rust formed is less than 30%.
6: An area where white rust formed is less than 40%.
5: An area where white rust formed is less than 50%.
4: An area where white rust formed is less than 60%.
3: An area where white rust formed is less than 70%.
2: An area where white rust formed is less than 80%.
1: An area where white rust formed is less than 90%.

(2) Hydrophilicity:

After bringing the test heat exchanger into contact with running water for 72 hours, a contact angle with a water drop was measured. It may be considered that the smaller the contact angle, the higher the hydrophilicity is. The measurement of the contact angle was performed using an automatic contact angle meter "CA-Z", manufactured by Kyowa Interface Science Co., Ltd.

As for the hydrophilicity, a contact angle of not more than 40° is preferable.

(3) Odor:

After bringing the test heat exchanger into contact with running water of tap water for 72 hours, the heat exchanger was smelled and evaluated on six grades on the basis of the following evaluation criteria. The evaluation was made by five panelists, and an average value was calculated. As for the odor, a score of not more than 2.0 is preferable, and a score of not more than 1.5 is more preferable.

0: No odor is scent.
1: An odor is slightly felt at last.
2: An odor is easily felt.
3: An odor is distinctly felt.
4: An odor is strongly felt.
5: An odor is very strongly felt.

<Fabrication of Test Heat Exchanger>

As the heat exchanger, an automobile aluminum material-made heat exchanger having been flux-brazed with KAIF$_4$ and K$_3$AlF$_6$ (NB heat exchanger) was used. A flux amount of this heat exchanger was 50 mg/m$^2$ (on the fin surface) in terms of K.

This heat exchanger was subjected to the following Treatment I or Treatment II, thereby fabricating a test heat exchanger.

Treatment I (Rinsing with Hot Water→Hydrophilic Treatment →Baking)

After rinsing the heat exchanger with hot water at 50° C. for 30 seconds, the heat exchanger was dipped in a bath of a hydrophilic treatment liquid obtained in each of Examples 1 to 11 and 14 to 16 and Comparative Examples 1 to 2 and 4 to 5 at room temperature for 10 seconds, and a wet film amount was then controlled to a prescribed value by means of air blowing. Subsequently, the heat exchanger was subjected to a baking treatment by heating such that the temperature of the heat exchanger itself was kept at 140° C. for 5 minutes by a heating furnace, thereby fabricating a test heat exchanger.

Treatment II (Rinsing with Hot Water→Chemical Conversion Treatment→Hydrophilic Treatment→Baking)

After rinsing the heat exchanger with hot water at 50° C. for 30 seconds, the heat exchanger was subjected to a dipping treatment in a bath of a zirconium chemical treatment liquid having a Zr concentration of 500 ppm at a pH of 4 and a temperature of 60° C. for 60 seconds in each of Examples 12 to 13 and Comparative Example 3. Subsequently, the resulting heat exchanger was subjected to a dipping treatment with a hydrophilic treatment liquid obtained in each of Examples 12 to 13 and Comparative Example 3, blown with air, and then subjected to a baking treatment in the same manners as those in the foregoing Treatment I, thereby fabricating a test heat exchanger.

Example 1

(1) Preparation of Hydrophilic Treatment Liquid:
Lithium hydroxide as a lithium ion source in an amount of 0.1 parts in terms of a lithium ion, 2.0 pats of polyvinyl alcohol [degree of saponification: 99%, number average molecular weight: 60,000] that is a hydrophilic resin, and 2.0 parts of silica that is an inorganic crosslinking agent were blended, to which was then added ion-exchanged water to make to 100 parts, thereby preparing a hydrophilic treatment liquid.

(2) Fabrication of Test Heat Exchanger:
A test heat exchanger was fabricated according to the foregoing Treatment I with the hydrophilic treatment liquid obtained in the foregoing (1) and evaluated for physical properties. A content of each of the components in the hydrophilic treatment liquid and evaluation results of physical properties are shown in Table 1.

A film amount of the hydrophilic film in the test heat exchanger was 0.5 g/m$^2$. The film amount of the hydrophilic film was computed from a measured value by a TOC analyzer (TOC-VCSH, manufactured by Shimadzu Corporation) by using a conversion factor calculated from a relation between a hydrophilic film amount of a standard film sample and an organic carbon amount contained therein.

Also, a lithium concentration in the hydrophilic film was 2.4% by mass. The lithium concentration in the hydrophilic film was measured by means of atomic absorption spectrometry upon dissolution of the hydrophilic film in an acid.

Examples 2 to 11 and 14 to 16 and Comparative Examples 1 to 2 and 4 to 5

(1) Preparation of Hydrophilic Treatment Liquid:
Hydrophilic treatment liquids were prepared in the same manner as that in Example 1(1) in such a manner that a content of each of the components in the hydrophilic treatment liquid was a value shown in Table 1 or Table 2.

Incidentally, in the case of Example 2, lithium carbonate was used as the lithium ion source; and in the case of Examples 3 to 11 and 14 to 16, lithium hydroxide was used as the lithium ion source. In Comparative Examples 1 and 2, an alkali metal ion source was not added. Also, in the case of Comparative Examples 4 to 5, lithium hydroxide was used as the lithium ion source; sodium hydroxide was used as a sodium ion source; and potassium hydroxide was used as a potassium ion source.

(2) Fabrication of Test Heat Exchanger:
A test heat exchanger was fabricated in the same manner as that in Example 1 (2) and evaluated for physical properties. Incidentally, the film amount of the hydrophilic film in the test heat exchanger was 0.2 g/m$^2$ in Example 15, 2.0 g/m$^2$ in Example 16, and 0.5 g/m$^2$ in other Examples, respectively.

Evaluation results of physical properties of the test heat exchanger, and the film amount of the hydrophilic film and the lithium concentration in solids, which is a lithium concentration in the hydrophilic film, are shown in Table 1 or Table 2.

Examples 12 to 13 and Comparative Example 3

(1) Preparation of Hydrophilic Treatment Liquid:
Hydrophilic treatment liquids were prepared in the same manner as that in Example 1(1) in such a manner that a content of each of the components in the hydrophilic treatment liquids was a value shown in Table 1 or Table 2.

Incidentally, in the case of Examples 12 to 13, lithium hydroxide was used as the lithium ion source.

(2) Fabrication of Test Heat Exchanger:
A test heat exchanger was fabricated using the hydrophilic treatment liquid obtained in the foregoing (1) according to the foregoing Treatment II.

The film amount of the hydrophilic film in this test heat exchanger was measured in the same manner as that in Example 1(2). As a result, it was 0.5 g/m$^2$ in all of the cases.

Evaluation results of physical properties of the test heat exchanger, and the film amount of the hydrophilic film and the lithium concentration in solids, which is a lithium concentration in the hydrophilic film, are shown in Table 1 or Table 2.

TABLE 1

| | | | Example | | | | | | | |
|---|---|---|---|---|---|---|---|---|---|---|
| | | | 1 | 2 | 3 | 4 | 5 | 6 | 7 | 8 |
| Rust prevention treatment (zirconium chemical conversion treatment) | | | No | No | No | No | No | No | No | No |
| Hydrophilic treatment liquid | Lithium (lithium in hydrophilic film) | Unit: % (Solids content: %) | 0.1 (2.4) | 0.1 (2.9) | 0.1 (2.7) | 0.01 (0.2) | 1.0 (20.0) | 0.1 (3.0) | 0.05 (1.5) | 0.5 (11.1) |
| | Sodium (sodium in hydrophilic film) | Unit: % (Solids content: %) | — | — | — | — | — | — | — | — |
| | Potassium (potassium in hydrophilic film) | Unit: % (Solids content: %) | — | — | — | — | — | — | — | — |
| | Hydrophilic resin Polyvinyl alcohol[1] | Unit: % (Solids content: %) | 2.0 (48.8) | 1.0 (28.6) | 2.0 (55.6) | 2.5 (49.9) | 2.5 (50.0) | 2.0 (58.8) | 1.5 (46.1) | — |
| | Ethylene oxide-modified polyvinyl alcohol[2] | Unit: % (Solids content: %) | — | 2.0 (57.1) | 1.0 (27.8) | 1.5 (29.9) | 1.0 (20.0) | 1.0 (29.4) | 0.5 (15.4) | — |
| | Carboxymethyl cellulose[3] | Unit: % (Solids content: %) | — | — | — | — | — | — | — | 2.5 (55.6) |

TABLE 1-continued

|  |  |  | Example 1 | Example 2 | Example 3 | Example 4 | Example 5 | Example 6 | Example 7 | Example 8 |
|---|---|---|---|---|---|---|---|---|---|---|
|  | Poly(sodium vinylsulfonate)[4] | Unit: % (Solids content: %) | — | — | — | — | — | — | — | — |
|  | Polyacrylic acid[5] | Unit: % (Solids content: %) | — | — | — | — | — | — | — | 1.0 (22.2) |
| Crosslinking agent | Silica[6] | Unit: % (Solids content: %) | 2.0 (48.8) | — | 0.5 (13.9) | 1.0 (20.0) | — | — | 1.0 (30.8) | — |
|  | Ammonium fluorozirconate[7] | Unit: % (Solids content: %) | — | 0.4 (11.4) | — | — | 0.5 (10.0) | — | — | — |
|  | Phenol resin[8] | Unit: % (Solids content: %) | — | — | — | — | — | — | — | 0.5 (11.1) |
| Guanidine compound | Polyhexamethylene biguanidine[9] | Unit: % (Solids content: %) | — | — | — | — | — | 0.3 (8.8) | 0.2 (6.2) | — |
| Hydrophilic film amount |  | Unit: g/m$^2$ | 0.5 | 0.5 | 0.5 | 0.5 | 0.5 | 0.5 | 0.5 | 0.5 |
| Evaluation results | Corrosion resistance |  | 9.0 | 9.0 | 9.0 | 9.0 | 9.0 | 9.0 | 9.0 | 8.0 |
|  | Hydrophilicity | Unit: ° | 16 | 22 | 20 | 20 | 23 | 23 | 20 | 18 |
|  | Odor |  | 1.5 | 1.0 | 1.0 | 1.0 | 1.0 | 1.0 | 1.0 | 2.0 |

|  |  |  | Example 9 | Example 10 | Example 11 | Example 12 | Example 13 | Example 14 | Example 15 | Example 16 |
|---|---|---|---|---|---|---|---|---|---|---|
| Rust prevention treatment (zirconium chemical conversion treatment) |  |  | No | No | No | Yes | Yes | No | No | No |
| Hydrophilic treatment liquid | Lithium (lithium in hydrophilic film) | Unit: % (Solids content: %) | 0.5 (11.1) | 0.2 (4.5) | 0.1 (2.7) | 0.1 (2.4) | 0.1 (2.4) | 0.3 (7.5) | 0.1 (2.4) | 0.1 (2.4) |
|  | Sodium (sodium in hydrophilic film) | Unit: % (Solids content: %) | — | — | — | — | — | — | — | — |
|  | Potassium (potassium in hydrophilic film) | Unit: % (Solids content: %) | — | — | — | — | — | — | — | — |
| Hydrophilic resin | Polyvinyl alcohol[1] | Unit: % (Solids content: %) | 2.5 (55.6) | 2.0 (44.4) | 2.0 (55.6) | 2.0 (48.8) | 2.0 (48.8) | 1.5 (37.5) | 2.0 (48.8) | 2.0 (48.8) |
|  | Ethylene oxide-modified polyvinyl alcohol[2] | Unit: % (Solids content: %) | — | 1.0 (22.2) | 1.0 (27.8) | — | — | 0.5 (12.5) | — | — |
|  | Carboxymethyl cellulose[3] | Unit: % (Solids content: %) | — | — | — | — | — | — | — | — |
|  | Poly(sodium vinylsulfonate)[4] | Unit: % (Solids content: %) | 1.0 (22.2) | — | — | — | — | — | — | — |
|  | Polyacrylic acid[5] | Unit: % (Solids content: %) | — | — | — | — | — | — | — | — |
| Crosslinking agent | Silica[6] | Unit: % (Solids content: %) | 0.5 (11.1) | 1.0 (22.2) | 0.5 (13.9) | 2.0 (48.8) | 1.5 (36.6) | 1.5 (37.5) | 2.0 (48.8) | 2.0 (48.8) |
|  | Ammonium fluorozirconate[7] | Unit: % (Solids content: %) | — | — | — | — | — | 0.2 (5.0) | — | — |
|  | Phenol resin[8] | Unit: % (Solids content: %) | — | 0.3 (6.7) | — | — | — | — | — | — |
| Guanidine compound | Polyhexamethylene biguanidine[9] | Unit: % (Solids content: %) | — | — | — | — | — | 0.5 (12.2) | — | — |
| Hydrophilic film amount |  | Unit: g/m$^2$ | 0.5 | 0.5 | 0.5 | 0.5 | 0.5 | 0.5 | 0.2 | 2.0 |
| Evaluation results | Corrosion resistance |  | 8.5 | 9.0 | 9.0 | 9.5 | 9.5 | 9.0 | 9.0 | 9.0 |
|  | Hydrophilicity | Unit: ° | 20 | 20 | 20 | 16 | 18 | 22 | 15 | 18 |
|  | Odor |  | 1.0 | 1.0 | 1.0 | 1.5 | 1.5 | 1.0 | 1.5 | 1.5 |

TABLE 2

|  | Comparative Example 1 | Comparative Example 2 | Comparative Example 3 | Comparative Example 4 | Comparative Example 5 |
|---|---|---|---|---|---|
| Rust prevention treatment (zirconium chemical conversion treatment) | No | No | Yes | No | No |

TABLE 2-continued

|  |  |  |  | Comparative Example | | | | |
|---|---|---|---|---|---|---|---|---|
|  |  |  |  | 1 | 2 | 3 | 4 | 5 |
| Hydrophilic treatment liquid | Lithium (lithium in hydrophilic film) |  | Unit: % (Solids content: %) | — | — | — | — | — |
|  | Sodium (sodium in hydrophilic film) |  | Unit: % (Solids content: %) | — | — | — | 0.1 (2.4) | — |
|  | Potassium (potassium in hydrophilic film) |  | Unit: % (Solids content: %) | — | — | — | — | 0.1 (2.4) |
|  | Hydrophilic resin | Polyvinyl alcohol[1] | Unit: % (Solids content: %) | 2.0 (50.0) | — | 2.5 (50.0) | 2.0 (48.8) | 2.0 (48.8) |
|  |  | Ethylene oxide-modified polyvinyl alcohol[2] | Unit: % (Solids content: %) | — | — | 1.0 (20.0) | — | — |
|  |  | Carboxymethyl cellulose[3] | Unit: % (Solids content: %) | — | 2.5 (62.5) | — | — | — |
|  |  | Poly(sodium vinylsulfonate)[4] | Unit: % (Solids content: %) | — | — | — | — | — |
|  |  | Polyacrylic acid[5] | Unit: % (Solids content: %) | — | 1.0 (25.0) | — | — | — |
|  | Crosslinking agent | Silica[6] | Unit: % (Solids content: %) | 2.0 (50.0) | — | 1.5 (30.0) | 2.0 (48.8) | 2.0 (48.8) |
|  |  | Ammonium fluorozirconate[7] | Unit: % (Solids content: %) | — | — | — | — | — |
|  |  | Phenol resin[8] | Unit: % (Solids content: %) | — | 0.5 (12.5) | — | — | — |
|  | Guanidine compound | Polyhexamethylene biguanidine[9] | Unit: % (Solids content: %) | — | — | — | — | — |
| Hydrophilic film amount |  |  | Unit: g/m² | 0.5 | 0.5 | 0.5 | 0.5 | 0.5 |
| Evaluation results | Corrosion resistance |  |  | 3.0 | 2.0 | 5.0 | 3.0 | 3.0 |
|  | Hydrophilicity |  | Unit: ° | 16 | 18 | 20 | 16 | 16 |
|  | Odor |  |  | 2.0 | 2.5 | 1.0 | 2.0 | 2.0 |

[Note]
[1] Polyvinyl alcohol: [Degree of saponification: 99%, number average molecular weight: 60,000]
[2] Ethylene oxide-modified polyvinyl alcohol: [Degree of saponification: 99%, number average molecular weight: 20,000, content proportion of polyoxyethylene group (proportion of polyvinyl alcohol relative to all of pendant groups): 3%, repeating number of oxyethylene group in polyoxyethylene group (polymerization degree): 10]
[3] Carboxymethyl cellulose: [Number average molecular weight: 10,000]
[4] Poly(sodium vinylsulfonate): [Number average molecular weight: 20,000]
[5] Polyacrylic acid: [Number average molecular weight: 20,000]
[6] Silica (anhydrous silica): [Average diameter of primary particle: 10 nm], inorganic crosslinking agent
[7] Ammonium fluorozirconate, inorganic crosslinking agent
[8] Phenol resin: [Resole type phenol], organic crosslinking agent
[9] Polyhexamethylene biguanidine: [Mass average molecular weight: 5,000]

Incidentally, the values of lithium in the hydrophilic film, sodium in the hydrophilic film, and potassium in the hydrophilic film as described in the parentheses in Table 1 and Table 2 are concentrations (% by mass) of lithium, sodium, and potassium in the hydrophilic films (solids), respectively. Also, the values of other components than those as described above in the parentheses in Table 1 and Table 2 are % by mass in the whole of solids of the hydrophilic treatment liquid, respectively.

As is clear from the evaluation results of physical properties of the Examples and Comparative Examples of Table 1 and Table 2, in the aluminum material-made heat exchanger having been flux-brazed by the NB process, which is subjected to a hydrophilic treatment with the hydrophilic treatment liquid of the present invention, not only the corrosion resistance is significantly enhanced, but the deodorizing properties are enhanced, without impairing the hydrophilicity of the surface.

Also, from the comparison of Examples 12 and 13 with other Examples, it is noted that the corrosion resistance is more enhanced by subjecting the heat exchanger to a chemical conversion treatment in advance and then to a hydrophilic treatment.

INDUSTRIAL APPLICABILITY

The hydrophilic treatment method of a heat exchanger of the present invention is applied to an aluminum material-made heat exchanger having been flux-brazed by the NB process, in particular, an aluminum material-made heat exchanger to be used for automobile air conditioner, and even when the heat exchanger is not subjected to a chemical conversion treatment in advance, by applying a surface treatment with a hydrophilic treatment liquid containing a lithium ion, not only the corrosion resistance can be significantly enhanced, but the deodorizing properties can be enhanced, without impairing the hydrophilicity.

The invention claimed is:

1. An anti-corrosion treatment method for an aluminum material-made heat exchanger comprising subjecting an aluminum material-made heat exchanger having been flux-brazed by the NOCOLOK brazing process to hydrophilic treatment liquid and then applying a baking treatment to form a hydrophilic film on the surface of the aluminum material-made heat exchanger, wherein the hydrophilic treatment liquid contains a hydrophilic resin and a lithium ion, and a lithium concentration in the hydrophilic film is from 0.05 to 25% by mass; and an ion exchange reaction occurs between an alkali metal ion in the flux and a lithium ion from the hydrophilic film, the reaction forming a sparingly soluble film at least at an interface between the flux and the hydrophilic film.

2. The anti-corrosion treatment method for an aluminum material-made heat exchanger according to claim 1, wherein a film amount of the hydrophilic film is from 0.1 to 5.0 g/m$^2$.

3. The anti-corrosion treatment method for an aluminum material-made heat exchanger according to claim 1, wherein after subjecting the heat exchanger to a chemical conversion treatment in advance, the heat exchanger is brought into contact with the hydrophilic treatment liquid and then subjected to a baking treatment.

4. The anti-corrosion treatment method for an aluminum material-made heat exchanger according to claim 1, wherein the heat exchanger is an aluminum material-made heat exchanger which has not been subjected to a chemical conversion treatment in advance.

5. The anti-corrosion treatment method for an aluminum material-made heat exchanger according claim 1, wherein the hydrophilic resin is polyvinyl alcohol having a degree of saponification of 90% or more and/or modified polyvinyl alcohol.

6. The anti-corrosion treatment method for an aluminum material-made heat exchanger according to claim 1, wherein the hydrophilic treatment liquid further contains a crosslinking agent.

* * * * *